UNITED STATES PATENT OFFICE.

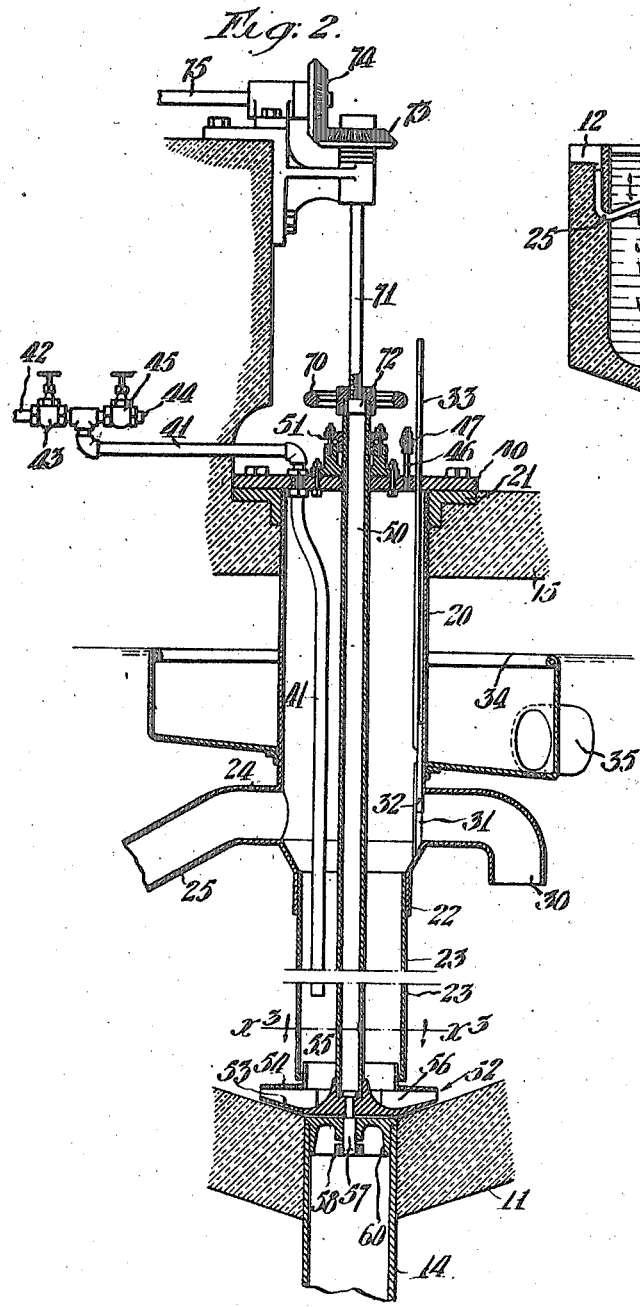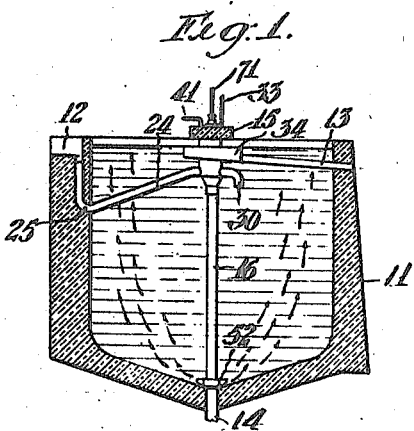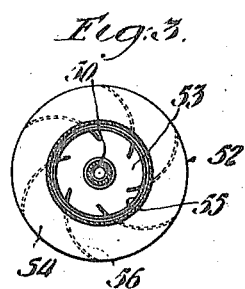

ALBERT M. BROSIUS, OF PASADENA, CALIFORNIA.

APPARATUS FOR AERATING SEWAGE.

1,286,520.　　　　　　Specification of Letters Patent.　　　Patented Dec. 3, 1918.

Application filed August 28, 1916. Serial No. 117,369.

*To all whom it may concern:*

Be it known that I, ALBERT M. BROSIUS, a citizen of the United States, residing at Pasadena, in the county of Los Angeles and State of California, have invented a new and useful Apparatus for Aerating Sewage, of which the following is a specification.

My invention relates to sewage purification, and particularly to the treatment of sewage by the use of bacteria.

This application is a continuation in part of application Serial No. 67,667, filed by me on December 18th, 1915.

Chemically considered sewage is a mixture of hydrocarbons with water, this mixture carrying nitrogen, sulfur, and other compounds partially decomposed in suspension and solution. Bacteria multiply in sewage and cause certain chemical and physical changes to occur. These bacteria may be classed as aerobic, facultative aerobic, facultative anaerobic and anaerobic. The aerobes can only exist in the presence of free oxygen of the air, and the anaerobes cannot exist in the presence of free oxygen. The facultative bacteria can exist where free oxygen is present or absent, but becomes more or less active as the oxygen conditions become more or less favorable. The anaerobes which are more active when free oxygen is absent, cause putrefaction by extracting a certain amount of oxygen from the compound of the sewage, the products of this putrefaction being ammonia, hydrocarbon compounds, hydrogen, and carbon sulfids, and the like, these compounds being all more or less injurious and objectionable, and all containing very little oxygen. When a sufficient quantity of oxygen is supplied to the sewage the aerobic and facultative aerobic and anaerobic bacteria become active and the sewage is oxidized forming stable and unobjectionable compounds.

The principal object of the invention is to provide means for treating sewage, utilizing aerobic and facultative bacteria for this purpose.

To accomplish such treatment I provide means for supplying sewage containing an abundance of oxygen to a bacterial culture consisting of sewage sludge in which the facultative bacteria have been allowed to develop. I find, however, that where such a culture is used for long periods to treat large amounts of sewage that the culture becomes weak and inefficient, and that it must then be allowed to stand for a certain length of time under anaerobic conditions and then be aerated so that the bacteria may be again properly developed.

In the use of bacteria for the above purposes it is common practice to provide a tank in which the culture is placed, and into which the sewage is run, this tank having air forced through it to supply the facultative bacteria with the necessary oxygen to effect an oxidization of the sewage. The efficiency of the method depends on the fineness of the air bubbles supplied, and various means have been developed to finely divide the air and distribute it through the mass of sewage.

The principal object of my invention is to provide a new and improved means for dividing the air and mixing it with the sewage to be treated. This I accomplish by providing means for thoroughly mixing the sewage with air to form a foam, this foam then being passed into a tank containing the culture. By producing a mechanical foam composed of sewage and air, the air is broken up into a multitude of fine bubbles so that the maximum of efficiency is obtained. This foam I form by mechanically mixing air with the sewage by means of rotating paddles. These paddles serve to mechanically break up the sewage and to mix therewith the fine air bubbles.

In my application Serial No. 67,667 filed December 18th, 1915, I disclosed a general system of treatment in which foam producing means were used. In the former application foam producing means were, however, located outside the tank and I found that the method was somewhat inefficient due to the separation of the air into large masses before it entered the treating tank.

A further object of the present invention is to provide means to mix the air and sewage in the extreme bottom of the treatment tank and to immediately thereafter expel the foam so formed into the contents of the tank. Referring to the drawings which are for illustrative purposes Figure 1 is a somewhat diagrammatic view partly in section of a treating tank embodying my invention.

Fig. 2 is an elevation on a large scale of the apparatus located in the center of the tank in Fig. 1, a portion of this apparatus being broken away to better illustrate the invention.

Fig. 3 is a plan view on a plane represented by the line X³—X³ of Fig. 2, this plane being viewed in the direction of the arrows. In the form of my invention illustrated in the drawing a tank 11 is provided, this tank having a sewage inlet channel 12, a liquid outlet channel 13, and a sludge discharge pipe 14. A concrete beam 15 extends across the center of the tank above the level of the liquid therein and serves to support the mixing column 16. The mixing column 16 consists of a stationary shell 20 which is secured to a flange 21 carried in the concrete beam 15 and which is provided on its lower end with a collar 22, this collar being somewhat smaller in diameter than the main portion of the shell 20 and fitting tightly around the downflow pipe 23. Secured in the lower portion of the stationary shell 20 is a sewage supply pipe 24, this pipe being bent down as shown at 25 in Fig. 1 to form a seal and then extending upwardly and connecting with the channel 12. A liquid intake pipe 30 is connected into the stationary shell 20 opposite the pipe 24, the opening 31 between the shell 20 and the intake pipe 30 being partially or wholly closed by means of a gate 32 provided with an operating stem 33.

An overflow weir 34 is secured to the stationary shell 20 above the pipes 24 and 30, and is connected through a discharge pipe 35 with the liquid outlet channel 13. A cover 40 is tightly secured to the flange 21 preferably by bolts, the stem 33 projecting through the cover 40 as shown in Fig. 2. An air supply pipe 41 also projects through the cover 40 extending downwardly inside the downflow pipe 23. The air supply pipe 41 may be supplied with compressed air through a compressed air supply pipe 42 the flow of compressed air through this pipe being regulated by a valve 43. The length of the pipe 41 depends on conditions. Under some conditions the valve 43 may be closed and atmospheric air may be admitted to the air supply pipe 41 through an air intake 44 in an air intake valve 45. When compressed air is being used the valve 45 is closed. A pipe 46 having a valve 47 is secured in the cover 40.

Extending downwardly through a stuffing box 51 in the cover 40 is a central shaft 50, this shaft being made of considerable diameter to provide the necessary stiffness and being made hollow to reduce its weight. Secured to the lower end of the central shaft 50 is an impeller or mixer 52. This impeller or mixer consists of a bottom casting 53, a top 54, a collar 55 and a series of curved vanes 56. Rigidly secured in the casting 53 is a steady bearing shaft 57, which has a collar 58 secured thereon. On the steady bearing shaft 57 is a foot valve 60, this valve fitting inside a sludge discharge pipe 14 and serving to provide a bearing for the steady bearing shaft 57 as well as to close the upper end of the sludge discharge pipe 14.

Rigidly secured in the upper end of the central shaft 50 is a hand wheel 70, this hand wheel being threaded to receive a driving shaft 71, the driving shaft having a head 72. The direction of rotation of the impeller 56 being righthanded and the threads on the shaft 51 being left handed it is obvious that when the hand wheel 70 is jammed down against the head 72 that the shaft 71 and the shaft 50 will be solidly locked together. Shaft 71 is driven through bevel gear 73 and 74 from a shaft 75 which may be driven from any convenient source of power.

The method of operation is as follows:

The tank 11 being filled with sewage in which bacteria have previously been developed, additional sewage is allowed to flow through the channel 12 passing through the seal 25 and the sewage supply pipe 24 to the stationary shell 20, the parts being located as shown in Fig. 2. The sewage flows downwardly through the downflow pipe 23. The impeller 56 serves to intimately mix air furnished by the air supply pipe 41 with the sewage to form a foam in which the air is present in the form of fine bubbles. These bubbles are thrown out from the periphery of the impeller 56 and are widely and uniformly distributed through the contents of the tank 11 as they rise from the bottom thereof. These air bubbles furnish the oxygen which is necessary for the propagation and support of the bacteria. Under some conditions it is necessary to supply compressed air through the air supply pipe 41. In this case the valve 45 is closed and the valve 43 is opened, but by running the impeller 52 at a proper speed it creates sufficient suction to operate on atmospheric air, if desired the valve 47 may be opened thus admitting air to the top of the pipe 20, or the valve 43 is closed and the valve 45 is opened, thus admitting air through the pipe 41. If desired, liquid may be admitted to the downflow pipe 23 by raising the gate 32, this liquid being taken in through the liquid intake pipe 30.

A flow of liquid through the opening 31 is necessary when the flow of sewage through the pipe 24 is small. Unless a certain quantity of liquid is supplied to the pipe 24 sufficient air is not drawn down by the falling column of liquid to produce the desired foam. If at any time it is desired to discharge the contents of the tank 11, this may be done as follows:

The motion of the shaft 75 is stopped and the hand wheel 70 is then rotated in such a manner as to lift the pipe 50 on the shaft 71 due to the screw threads thereon. This lifts the impeller 52, the downflow pipe 23 sliding in the collar 22. The foot valve 60 is also lifted, thus opening the sludge discharge pipe 14 and allowing the material in the tank to discharge therethrough.

When the apparatus is operating with a supply of compressed air flowing through the pipe 41, the valves 45 and 47 being closed and the valve 43 being open, there will be some pressure in the space above the liquid in the shell 20. If this pressure increases abnormally it relieves itself through the pipe 30 rather than to blow back through the sewage in the pipe 25. To prevent the air from thus blowing back the seal 25 is provided, the depth of this seal below the surface of the contents of the tank being considerably greater than the depth of the bend of the pipe 30.

In the practical operation of my invention a supply of sewage sludge in the tank 11 is first thoroughly aerated for a considerable period by opening the gate 32 and circulating the contents of the tank 11 through the impeller 52 in which it is thoroughly mixed with air bubbles which are thrown out by the impeller 52 into the contents of the tank 11 thus thoroughly aerating this contents. During this aerating period the proper species of bacteria are increased very fast and the period continues until they are present in sufficient quantities to warrant starting the sewage through the tank, no sewage being allowed to flow during the preparatory period. During the sewage treatment period the sewage with or without liquid from the pipe 30 is mixed with air in the impeller 52 in such a manner as to form a foam, the fine air bubbles of which are thrown out into the sewage in the tank 11 thus thoroughly aerating it and supplying the bacteria with the oxygen necessary for their function.

By placing the impeller in the bottom of the tank, forming the foam therein and immediately throwing this foam out into the tank the fine air bubbles do not have an opportunity to unite but rise through the liquid in the tank 11 in the form of minute bubbles which have a large contact surface in proportion to their volume and are thus very efficient.

I claim as my invention:—

1. In an apparatus for treating sewage, a foam chamber, means for introducing sewage into said chamber, and paddle means in said chamber for churning air into said sewage to form a foam.

2. In an apparatus for treating sewage; a tank; pipe means for passing air into the sewage in said tank; and a power driven mixing means for finely subdividing said air to form a foam.

3. In an apparatus for treating sewage a tank; a downflow pipe for passing a mixture of sewage and air to the bottom of said tank; and a power driven impeller for breaking up said mixture of sewage and air to form a foam and for expelling said foam into said tank.

In testimony whereof, I have hereunto set my hand at Los Angeles, California, this 21st day of August, 1916.

ALBERT M. BROSIUS.